(12) United States Patent
Herold et al.

(10) Patent No.: US 8,043,589 B2
(45) Date of Patent: *Oct. 25, 2011

(54) PROCESS FOR REMOVING CARBONYL SULPHIDE AND HYDROGEN SULPHIDE FROM A SYNTHESIS GAS STREAM

(75) Inventors: Rudolf Henri Max Herold, Amsterdam (NL); Thijme Last, Amsterdam (NL); Bernardus Josephus Maria Manshande, Amsterdam (NL); Cornelis Jacobus Smit, Amsterdam (NL)

(73) Assignee: Shell Oil Company, Houston, TX (US)

(*) Notice: Subject to any disclaimer, the term of this patent is extended or adjusted under 35 U.S.C. 154(b) by 500 days.

This patent is subject to a terminal disclaimer.

(21) Appl. No.: 12/161,096

(22) PCT Filed: Jan. 17, 2007

(86) PCT No.: PCT/EP2007/050439
§ 371 (c)(1),
(2), (4) Date: Jul. 16, 2008

(87) PCT Pub. No.: WO2007/082896
PCT Pub. Date: Jul. 26, 2007

(65) Prior Publication Data
US 2010/0197984 A1 Aug. 5, 2010

(30) Foreign Application Priority Data
Jan. 18, 2006 (EP) .................. 06100495

(51) Int. Cl.
*B01D 53/00* (2006.01)
*C07C 1/00* (2006.01)

(52) U.S. Cl. ........ 423/230; 423/220; 423/236; 423/237; 423/239.1; 585/16; 585/733

(58) Field of Classification Search .................. 423/220, 423/230, 236, 239.1
See application file for complete search history.

(56) References Cited

U.S. PATENT DOCUMENTS

| 3,441,370 A | 4/1969 | Gutmann, et al. ............... 23/2 |
| 3,974,256 A | 8/1976 | Wheelock et al. ............ 423/230 |
| 4,088,736 A | 5/1978 | Courty et al. ................. 423/230 |
| 4,254,094 A | 3/1981 | Hegarty ..................... 423/648 R |
| 4,271,133 A | 6/1981 | Tellis ............................ 423/230 |
| 4,299,802 A * | 11/1981 | Tellis ...................... 423/244.06 |
| 4,478,800 A | 10/1984 | van der Wal et al. ......... 423/230 |
| 4,871,710 A | 10/1989 | Denny et al. ................. 502/414 |
| 4,888,131 A | 12/1989 | Goetsch et al. ............... 252/373 |
| 4,994,257 A | 2/1991 | Suchiro et al. ................. 423/577 |
| 5,104,630 A * | 4/1992 | Holmes et al. ............ 423/243.11 |
| 5,169,612 A | 12/1992 | Nielsen ......................... 423/230 |
| 5,463,168 A * | 10/1995 | Audeh et al. .................. 585/854 |
| 6,103,206 A | 8/2000 | Taylor, Jr. et al. ............. 423/210 |
| 6,322,763 B1 | 11/2001 | McDaniel .................. 423/242.1 |
| 6,444,185 B1 | 9/2002 | Nougayrede et al. ...... 423/242.1 |
| 6,551,566 B1 | 4/2003 | Grover et al. .................. 423/240 |
| 6,692,711 B1 | 2/2004 | Alexion et al. ................ 423/210 |
| 7,056,487 B2 * | 6/2006 | Newby .......................... 423/650 |
| 7,588,627 B2 * | 9/2009 | Kijlstra et al. ................... 95/187 |
| 7,625,432 B2 * | 12/2009 | Gouman et al. .................. 95/232 |
| 7,655,205 B2 * | 2/2010 | Van Grinsven et al. ... 423/242.1 |
| 7,846,325 B2 * | 12/2010 | Van Hardeveld et al. ..... 208/247 |

FOREIGN PATENT DOCUMENTS

| AU | 698392 | 10/1998 |
| DE | 10141193 | 3/2003 |
| EP | 0700717 | 3/1996 |
| EP | 0757969 | 2/1997 |
| RU | 2101324 | 8/1993 |
| WO | WO 9210270 | 6/1992 |
| WO | WO 9501217 | 1/1995 |
| WO | WO 9934917 | 7/1999 |
| WO | WO 03011436 | 2/2003 |

OTHER PUBLICATIONS

International Search Report dated Mar. 28, 2007 (PCT/EP2007/050439).
The Shell Middle Distillate Synthesis Process, Petroleum Review Apr. 1990 pp. 204-209.
A.L. Kohl and F.C. Riesenfeld, 1974, Gas Purification, 2nd edition, Gulf Publishing Co. Houston and R. N. Maddox, 1974, pp. 128-200, Gas and Liquid Sweetening, Campbell Petroleum Series.
International Search Report dated Sep. 26, 2005.
H.M. Huisman, "The hydrolysis of carbonyl sulphide, carbon disulphide and hydrogen cyanide on a titania catalyst," 1994, Ph.D. Thesis University of Utrecht, The Netherlands.
B.P. Williams, et al., "Carbonyl sulphide hydrolysis using alumina catalysts," Catalyst Today, 1999, pp. 99-104.
D.L. Smith, "Optimize solid bed adsorption systems," Hydrocarbon Process, May 1996, pp. 130-132.
Puraspec 2040 Sulphur Absorption, Synetix product data sheet.

* cited by examiner

*Primary Examiner* — Ellen McAvoy
(74) *Attorney, Agent, or Firm* — Charles W. Stewart

(57) ABSTRACT

The invention provides a process for removing COS and $H_2S$ from a feed synthesis gas stream comprising COS and $H_2S$, the process comprising contacting the feed synthesis gas stream with solid adsorbent at a temperature in the range of from 100 to 240° C. to remove carbonyl sulphide and hydrogen sulphide, thereby obtaining a purified synthesis gas stream, wherein the solid adsorbent comprises one or more metals or oxides of the metals or combinations thereof and the metals are selected from the group of Ag, Sn, Mo, Fe and Zn.

16 Claims, No Drawings

PROCESS FOR REMOVING CARBONYL SULPHIDE AND HYDROGEN SULPHIDE FROM A SYNTHESIS GAS STREAM

The present application claims priority of European Patent Application No. 06100495.8 filed 18 Jan. 2006.

The invention relates to a process for removing carbonyl sulphide (COS) and hydrogen sulphide ($H_2S$) from a synthesis gas stream comprising these contaminants.

Synthesis gas streams are gaseous streams being rich in carbon monoxide and hydrogen and further usually containing carbon dioxide, while also nitrogen, nitrogen-comprising components (such as HCN and $NH_3$) and steam may be present, as well as some other minor constituents. Synthesis gas streams are generally used for chemical processes. In particular, synthesis gas can be used for the preparation of hydrocarbons in a catalytic process, for example the so-called Fischer-Tropsch process.

Synthesis gas can be prepared in a synthesis gas generation unit, for example high temperature reformers, autothermal reformers or gasifiers using coal, oil residue or natural gas as feedstock.

Generally, natural gas comprises mainly methane and can further comprise other components such as lower hydrocarbons (e.g. ethane, propane, butane, pentane), nitrogen, carbon dioxide, sulphur contaminants and traces of oxygen and hydrogen. The amount and type of sulphur contaminants can vary. Common sulphur contaminants are $H_2S$, mercaptans (RSH) and COS.

Often, desulphurization of the feedstock used for the preparation of synthesis gas is difficult to achieve or incomplete and consequently unwanted contaminants such as sulphur compounds, especially $H_2S$ and COS, are still present in synthesis gas. Removal of these sulphur compounds to low levels is of considerable importance, because they may bind irreversibly on catalysts and cause sulphur poisoning. This results in a deactivated catalyst, which severely hampers the catalytic process. To this end, removal of COS and $H_2S$ from synthesis gas to very low levels, in the ppb range, is required.

Processes for removal of COS and $H_2S$ from synthesis gas are known in the art. For example, in U.S. Pat. No. 6,322,763, a process is described wherein water in a wet scrubber is used to achieve hydrolysis of COS according to:

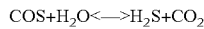

$$COS + H_2O \longleftrightarrow H_2S + CO_2$$

A disadvantage of the process described in U.S. Pat. No. 6,322,763 is that the concentration of COS in the synthesis gas stays in the ppm range, which may result in catalyst poisoning in a catalytic conversion of the synthesis gas. Even levels as low as 10 ppbv are unacceptable for a commercial hydrocarbon synthesis plant. Catalysts comprising cobalt as a catalytically active element are particularly sensitive. Even levels as low as for example 5 ppbv are unacceptably high for a commercial hydrocarbon synthesis process wherein a cobalt catalyst is used. As the catalyst deactivates, hydrocarbon production decreases and the reactor has to be taken off line for catalyst replacement.

Therefore, there is a need for a simple process enabling the removal of COS and $H_2S$ from synthesis gas to a low level, especially in the ppbv range.

To this end, the invention provides a process for removing COS and $H_2S$ from a feed synthesis gas stream comprising COS and $H_2S$, the process comprising contacting the feed synthesis gas stream with solid adsorbent at a temperature in the range of from 100 to 240° C. to remove carbonyl sulphide and hydrogen sulphide, thereby obtaining a purified synthesis gas stream, wherein the solid adsorbent comprises one or more metals or oxides of the metals or combinations thereof and the metals are selected from the group of Ag, Sn, Mo, Fe and Zn.

It has been found that by contacting the synthesis gas stream with the solid adsorbent at a temperature in the range of from 100 to 240° C., removal of COS as well as of $H_2S$ can be achieved to low levels, even to the ppbv range. The purified synthesis gas thus-obtained, because of its low level of contaminants, is especially suitable for use in a catalytic reaction. In particular, the purified synthesis gas stream is suitable for use in a Fischer Tropsch hydrocarbon synthesis reaction using a cobalt catalyst.

Typically, the feed synthesis gas stream is generated in a synthesis generation unit such as a high temperature reformer, an autothermal reformer or a gasifier. See for example Maarten van der Burgt et al., "The Shell Middle Distillate Synthesis Process, Petroleum Review April 1990 pp. 204-209".

Synthesis gas generated in reformers comprises conventionally substantial amounts of carbon monoxide and hydrogen and further comprises carbon dioxide, steam, various inert compounds and impurities such as sulphur compounds. Synthesis gas generated in gasifiers conventionally comprises lower levels of carbon dioxide.

It will be understood that the amount of COS and of $H_2S$ depends on the amount of these contaminants present in the feedstock used to generate the feed synthesis gas stream.

When using natural gas as feedstock, generally the amount of $H_2S$ and COS in natural gas is below 15 volume %, typically below 5 volume %, based on the natural gas. In some cases the amount of $H_2S$ and COS is in the range of from 5 to 15 ppmv, based on the natural gas.

After gasification or reforming or autothermal reforming of natural gas, the amount of $H_2S$ and COS in the gas stream leaving the gasifier or reformer will generally be reduced to an amount of between one fifth and half, typically one third of the amount which was present in the natural gas. Typically, the amount of $H_2S$ and COS in the gas stream leaving the gasifier will be below 5 volume %, or even below 1 volume %. In some cases the amount of $H_2S$ and COS is in the range of from 1 to 5 ppmv, preferably from 3 to 4 ppmv, based on the gas stream.

When using coal as feedstock, generally the amount of $H_2S$ and COS in the synthesis gas stream leaving the gasifier is below 15 volume %, typically below 5 volume % based on the feed synthesis gas stream. In some cases the amount of $H_2S$ and COS in the synthesis gas stream leaving the gasifier is in the range of from 5 to 15 ppmv, based on the feed synthesis gas stream, preferably from 8 to 12 ppmv based on the synthesis gas stream.

When using an oil residue as feedstock, generally the amount of $H_2S$ and COS in the synthesis gas stream leaving the gasifier will be below 20 volume %, typically below 10 volume % based on the synthesis gas stream. In some cases the amount of $H_2S$ and COS in the feed synthesis gas stream leaving the gasifier is in the range of from 15 to 30 ppmv, preferably from 20 to 28 ppmv based on the synthesis gas stream.

The synthesis gas stream generated from a feedstock may comprise particulate matter, for example soot particles. Therefore, in a preferred embodiment the synthesis gas exiting a synthesis gas generation unit is contacted with scrubbing liquid in a soot scrubber to remove particulate matter, in particular soot, thereby obtaining the feed synthesis gas stream. The synthesis gas stream exiting the synthesis gas generating unit is generally at elevated temperature and/or elevated pressure. Especially in the event that the synthesis gas is generated in a gasifier, the synthesis gas stream exiting the gasifier will be at elevated temperature and at elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 120 to 160° C., more preferably from 130 to 150° C. Preferably, the pressure at which the synthesis gas stream is contacted with scrubbing liquid is in the range of from 20 to 80 bara, more preferably from 20 to 60 bara.

In addition to $H_2S$ occurring in the feed synthesis gas stream as a result from the feedstock, $H_2S$ can also be present because it has been added to prevent or suppress metal dusting. Metal dusting corrosion involves disintegration of metals and alloys into small particles of metal, metal carbides, metal oxides and carbon. It is believed that the transfer of carbon from the gas phase to the metal or alloy plays a key part in metal dusting. Carbon monoxide is the predominant cause of metal dusting, but hydrocarbons can also lead to metal dusting. For kinetic reasons metal dusting only proceeds significantly at a temperature of above a certain level, typically 300° C. The presence of $H_2S$ in a carbon monoxide containing gas can suppress metal dusting. The $H_2S$ source may be for example a gas containing $H_2S$ or another sulphur compounds, which at the process conditions will decompose into $H_2S$, for example dimethyldisulphide. Thus, in a specific embodiment the feed synthesis gas stream is obtained by adding $H_2S$ or an $H_2S$ source to a synthesis gas stream to prevent metal dusting.

For the purposes of the invention, the amount of $H_2S$ and COS in the feed synthesis gas stream will be up to 10 ppmv, preferably up to 5 ppmv. The amount of $H_2S$ is preferably up to 500 ppbv $H_2S$, still more preferably up to 300 ppbv $H_2S$ and most preferably up to 100 ppbv $H_2S$, based on the total feed synthesis gas stream.

The amount of COS in the feed synthesis gas stream depends on the composition of the feedstock from which the synthesis gas is derived and the technology applied for the production of synthesis gas.

Generally, the amount of COS in the feed synthesis gas stream is from about 1 ppbv to about 500 ppbv, preferably from about 2 ppbv to about 200 ppbv, more preferably from about 10 ppbv to about 100 ppbv, based on the feed synthesis gas stream.

The ratio between $H_2S$ and COS in the feed synthesis gas is set by the equilibrium between COS and $H_2S$ at the conditions prevailing in the feed synthesis gas generating unit. The process according to the invention is especially suitable for feed synthesis gas streams having a $H_2S$:COS ratio in the range from 100:40 to 90:30, especially about 80:20.

In those cases where the amount of $H_2S$ and COS in the synthesis gas leaving the synthesis gas producing unit, which can be for example a gasifier, a reformer or an autothermal reformer, exceeds 10 ppmv, the sulphur amount in the synthesis gas can be reduced first by conventional scrubbing technologies applied either on the synthesis gas exiting the synthesis gas generation unit and/or on the feedstock entering the synthesis gas generation unit in the case of natural gas as feedstock. This results in a feed synthesis gas stream, having an amount of $H_2S$ of up to 10 ppmv, which enables removal of COS to levels in the ppbv range.

Therefore, in one preferred embodiment a process using one or more solvent formulations based on amines or physical solvents is used in a bulk $H_2S$ removal step either to remove a large part of the $H_2S$ from the synthesis gas exiting a synthesis gas generation unit or to remove a large part of the $H_2S$ from the natural gas which is used as feedstock to generate synthesis gas, resulting in a feed synthesis gas stream having an amount of $H_2S$ up to 10 ppmv.

In a more preferred embodiment, the bulk $H_2S$ removal step is selected from the group of ADIP, Sulfinol, Flexsorb, Purisol and Selexol. These processes are described in A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series. These processes are at least partly based on the finding that carbon dioxide and hydrogen sulphide are highly soluble under pressure in certain solvents, and readily releasable from solution when the pressure is reduced.

In another preferred embodiment, the bulk $H_2S$ removal step is based on the direct oxidation of $H_2S$. For example, a redox process in which the $H_2S$ is directly oxidised to elemental Sulphur using an iron chelate compound while the ferric ions are reduced, followed by regeneration of the ferric ions by oxidation with air. This process is known as the SulFerox process. Another example is a combination of scrubbing the feed synthesis gas with an alkali compounds to convert $H_2S$ to $RS^-$, followed by oxidation of $RS^-$ using a biological agent. See for example WO 92/10270.

In yet another preferred embodiment, the bulk $H_2S$ removal step involves using refrigerated methanol as a scrubbing solvent. When using refrigerated methanol, sulphur levels of 0.1 ppmv can be achieved.

All these processes can remove sulphur components to a level of 10 ppmv or less, preferably 1 ppmv or less.

The feed synthesis gas is contacted with solid adsorbent. The solid adsorbent comprises one or more metals or oxides of metals or combinations thereof, the metals being selected from the group of Ag, Sn, Mo, Fe and Zn. An especially preferred solid adsorbent is ZnO, because of its good performance. Another important advantage of ZnO is that the occurrence of unwanted side reactions such as water gas shift, hydrogenation of CO and $CO_2$ and methanol synthesis is much less.

It will be understood that preferably the solid adsorbent does not comprise any components which could act as a catalyst for the preparation of hydrocarbons. The catalytic preparation of hydrocarbons could lead to unwanted deposits of hydrocarbons on the solid adsorbent. Especially deposition of heavy hydrocarbons or waxy residues should be avoided. Known catalyst for the preparation of hydrocarbons are catalyst comprising metals or compounds selected from group VIII of the Periodic Table of the Elements. References to the Periodic Table and groups thereof used herein refer to the previous IUPAC version of the Periodic Table of Elements such as that described in the 68th Edition of the Handbook of Chemistry and Physics (CPC Press). Therefore, in a preferred embodiment the solid adsorbent is substantially free of metals or compounds comprising metals from group VIII of the Periodic Table of the Elements, meaning that the amount of metals or compounds comprising metals from group VIII of the Periodic Table of the Elements is less than 100 ppmw, preferably less than 10 ppmw based on the total solid adsorbent. In particular, preferably the solid adsorbent is substantially free of metals selected from the group of nickel, cobalt and ruthenium.

It will also be understood that it is preferred that the solid adsorbent does not comprise any components which could act as methanation catalysts. Methanation, the hydrogenation of carbon monoxide and/or carbon dioxide to methane, is a highly exothermic reaction and therefore needs to be avoided. A well-known methanation catalyst is nickel. Therefore, in a preferred embodiment the solid adsorbent is substantially free of nickel, meaning that the amount of nickel is less than 100 ppmw, preferably less than 10 ppmw, based on the total solid adsorbent.

The solid adsorbent can be used in any suitable form known in the art, which allows contacting the synthesis gas stream with the solid adsorbent. It is preferred to provide the solid adsorbent in a form which is easy to handle, in particular in loading and unloading the solid adsorbent from a suitable reactor, position or site. Pressing the solid adsorbent provides one suitable form of the material. One pressed form includes tablets, which tablets are then relatively easily loadable and unloadable from a reaction vessel through which the gas stream can pass. However, a disadvantage of using a pressed form is that the surface available for contact with the feed synthesis gas stream is relatively low. Thus, it is preferred that the solid adsorbent is supported on support material, especially an inorganic support material in order to, for example, increase the surface area, pore volume and pore diameter. Preferably, support material selected from the group of alumina, silica, titania, zirconia, carbon, silicon carbide and kieselguhr is used. Either one type of support materials can be used or mixtures of different the support materials can be used.

In a preferred embodiment, the solid adsorbent comprises alumina. It has been found that the presence of alumina results in an even better removal of COS. Preferably, the amount of alumina present in the solid adsorbent is in the range of from 0.1 to 5 wt %, more preferably from 0.1 to 3 wt %, based on total solid adsorbent.

The feed synthesis gas stream is contacted with solid adsorbent at a temperature in the range of from 100 to 240° C., preferably from 140° C. to 200° C. It has been found that at these temperatures, removal of both $H_2S$ and COS to low levels, even in the ppbv range, can be achieved.

The feed synthesis gas stream is contacted with solid adsorbent at a pressure in the range of from 1 to 100 bara, preferably from 20 to 80 bara, more preferably from 40 to 60 bara. By performing this step at elevated pressure, the purified synthesis gas stream will be at elevated pressure and can be further processed in a reaction which requires elevated pressure.

Without wishing to be bound by any theory for the removal of COS, it is believed that removal of COS takes place according to:

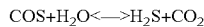

To facilitate removal of COS, the process is preferably carried out in the presence of water. The water is preferably present in the amount of up to 1% volume, more preferably in the amount of approximately 0.2% v/v, based on the total synthesis gas stream.

It will be understood that the concentrations of all four species, COS, $H_2O$, $H_2S$ and $CO_2$, influence the thermodynamic equilibrium of COS removal. The amount of $H_2S$ at thermodynamic equilibrium with COS, at a COS concentration at the end of the COS hydrolysis zone of 1 ppbv, at a given temperature and at given concentrations of $H_2O$ and $CO_2$ is referred to as [$H_2S$]equilibrium.

The process according to the invention involving removal of COS and of $H_2S$ adsorption, is especially suitable for purifying synthesis gas streams wherein the total concentration of $H_2S$ and COS does not exceed [$H_2S$]equilibrium. A removal of COS to a level of 2 ppbv can then be achieved at a GHSV of between 100 and 1000 m³/m³/h, especially about 400 m³/m³/h.

The gas space velocity may be similar to current processes, for example in the range 1,000-100,000/h, preferably approximately 10-20,000/h.

The process of the present invention can be part of other cleaning or guarding processes or treatments, such as those for reducing hydrogen cyanide, hydrogen sulfide, and ammonia in the gas stream, either simultaneously, or serially.

HCN can poison catalysts, especially hydrocarbon synthesis catalysts, even when present only in trace amounts. It has been found that the process according to the invention also enables removal of hydrogen cyanide (HCN). HCN is difficult to remove from synthesis gas because of its low solubility in common solvents and because it is usually present in low concentration, typically below 100 ppmv, making removal by solid adsorption difficult. Removal of HCN through alkaline scrubbing is hampered by the presence of other acidic compounds. The present invention enables removal of HCN using a solid adsorbent.

Therefore, in a preferred embodiment, the feed synthesis gas stream also comprises HCN and HCN is removed from the feed synthesis gas stream by contacting with solid adsorbent. It will be understood that the amount of HCN in the feed synthesis gas stream can vary, depending on the feedstock used to generate the feed synthesis gas stream. Generally, the amount of HCN in the feed synthesis gas stream is in the range of from 20 ppbv to 100 ppmv. The amount of HCN in the purified synthesis gas stream is preferably less than 10 ppbv, typically in the range of from 3 ppbv to 15 ppbv, preferably from 3 ppbv to 10 ppbv. It is believed that HCN is converted to $NH_3$.

The synthesis gas stream may be contacted with solid adsorbent either once or a plurality of times, preferably in a serial manner using more than one guard bed comprising solid adsorbent, so as to continue to reduce the COS content. Using the same material in more than one cleaning or guard bed provides additional advantages. If one guard bed fails, there is immediate 'back up' to maintain guard of the catalyst material, which material is generally much more expensive than guard bed material. This back-up helps in terms of safety as well as catalyst preserver. It also allows a guard bed to be off-line for other reasons, such as reloading, regeneration, cleaning, servicing or emergencies, whilst the other(s) guard bed is maintained and the overall catalytic process continues. Using individual guard bed materials for different impurities requires the catalytic process to stop every time any guard bed material or guard bed unit must be off-line or malfunctions.

The present invention provides a simple but effective process for the removal of COS and optionally HCN from a gas stream, especially with a material that can easily be located in existing guard beds—avoiding any re-engineering time and costs. As set out hereinbefore, the solid adsorbent also enable removal of other contaminants, providing a single solution to remove impurities.

The purified synthesis gas stream comprises pre-dominantly hydrogen and carbon monoxide and very low levels, in the ppbv range, of $H_2S$, COS and HCN.

Typically, the amount of $H_2S$ in the purified synthesis gas stream is 10 ppbv or less, preferably 5 ppbv or less, more preferably 1 ppbv, based on the purified synthesis. The process according to the invention typically results in a purified synthesis gas stream having an amount of COS of 10 ppbv or less. In most cases the amount of COS in the purified synthesis gas stream is 5 ppbv or less, or even 1 ppbv or less, based on the purified synthesis gas stream.

In a preferred embodiment, the purified synthesis gas stream is contacted with a suitable hydrocarbon synthesis catalyst to form normally liquid hydrocarbons in a hydrocarbon synthesis reaction. Optionally, prior to the hydrocarbon synthesis reaction, the purified synthesis gas is contacted with washing, liquid, preferably an aqueous washing liquid, to remove $NH_3$. This washing step further reduces the contaminant level in the purified synthesis gas stream. The $NH_3$ washing step is suitably performed at elevated temperatures, preferably in the range of from 40 to 110, more preferably from 70 to 110° C., most preferably at about 100° C. The $NH_3$ washing step is suitably performed at elevated pressures, preferably in the range of from 20 to 80 bara, more preferably from 40 to 60 bara. At elevated temperature and pressure, washing of $NH_3$ is more efficient. Furthermore, by performing the $NH_3$ washing step at elevated temperature, the resulting washed purified synthesis gas stream will already be at elevated temperature. When the purified synthesis gas stream is subsequently used in a catalytic hydrocarbon synthesis reaction taking place at elevated temperature, no excessive heating up of the washed purified synthesis gas stream is needed. Hence, the overall process can be performed in a more efficient way. This increased overall efficiency is enabled because in the $NH_3$ washing step, the need for additional removal of HCN is low. Generally, to prevent catalyst poisoning, both $NH_3$ and HCN would be removed in a washing step prior to contacting the purified synthesis gas stream with a hydrocarbon synthesis catalyst. HCN removal takes place at lower temperatures, due to the difference in solubility. If HCN removal is needed, the $NH_3$ washing step needs to be done at lower temperatures, typically below 40° C. Because HCN is now largely removed by contacting with solid adsorbent, the $NH_3$ washing step can be done at higher temperature.

Preferably the purified synthesis gas stream prepared by the present invention is used in a number of chemical reactions, in particular in Fischer-Tropsch reactions or processes. Catalysts for use in the Fischer Tropsch reaction frequently comprise, as the catalytically active component, a metal from Group VIII of the Periodic Table of Elements. Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

The amount of catalytically active metal on the carrier is preferably in the range of from 3 to 300 ppbw per 100 ppbw of carrier material, more preferably from 10 to 80 ppbw, especially from 20 to 60 ppbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters. Particularly preferred metal oxide promoters for the catalyst used to prepare the waxes for use in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C. Other processes for the preparation of Fischer-Tropsch catalysts comprise kneading/mulling, often followed by extrusion, drying/calcination and activation.

The hydrocarbon synthesis step may be performed under conventional hydrocarbon synthesis conditions known in the art. Preferably, the catalytic conversion may be effected at a temperature in the range of from 150 to 300° C., preferably from 180 to 260° C.

It is an advantage of the process according to the invention that removal of COS and of $H_2S$ and optionally of HCN is done in similar temperature ranges. This enables a more efficient overall process, as there is no need for additional cooling and no need for excessive heating in between the different process steps.

Typical total pressures for the catalytic conversion process are in the range of from 1 to 200 bar absolute, more preferably from 10 to 70 bar absolute. In the catalytic conversion process especially more than 75 wt % of $C_5^+$, preferably more than 85 wt % $C_5^+$ hydrocarbons are formed. Depending on the catalyst and the conversion conditions, the amount of heavy wax ($C_{20}^+$) may be up to 60 wt %, sometimes up to 70 wt %, and sometimes even up till 85 wt %. Preferably a cobalt catalyst is used, a low $H_2/CO$ ratio is used and a low temperature is used (190-230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955.

Preferably, a Fischer-Tropsch catalyst is used, which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch process may be a slurry FT process or a fixed bed FT process, especially a multitubular fixed bed.

The invention also provides the products obtained in the Fischer-Tropsch reaction, including distillates and hydroconverted products, e.g. fuels such as naphtha, kero and diesel, base oils and n-paraffins, lower detergent feedstocks and wax.

The invention will now be illustrated with the following non-limiting examples.

Experiments were conducted by employing a micro flow unit where the reactor was filled with solid adsorbent comprising ZnO subsequently exposed to a synthesis gas stream comprising water, nitrogen, carbon dioxide and the impurities herein described. The experiments were conducted in a multipurpose gas treating micro flow unit. The reactor had an internal diameter of 15 mm and was employed with a centrally placed thermowell with a diameter of 4 mm. Approximately 10 ml of solid adsorbent was used.

EXAMPLE 1

Comparative Example

A synthesis gas stream comprising COS and $H_2S$ and having the composition: CO 35.6%; $H_2$ 60.9%; $H_2O$ 0.2%; $N_2$ 0.21%, $CO_2$ 1.8% and $CH_4$ 1.3% was contacted with a fixed bed containing solid adsorbent comprising ZnO during certain time periods. The process conditions were: P=43.3 bar, T=40-60° C., GHSV=14400 h−1. The concentration of COS and $H_2S$ was measured at two points: (1) prior to contacting the synthesis gas stream with solid adsorbent ([$H_2S$]in and [COS]in) and (2) after contacting the synthesis gas stream with solid adsorbent ([$H_2S$]out and [COS]out). The results are given in table 1.

TABLE 1

Observed average $H_2S$ and COS concentration before and after contacting a synthesis gas stream with solid adsorbent comprising ZnO.

| Time period (months) | [$H_2S$]in (ppbv) | [$H_2S$]out (ppbv) | [COS]in (ppbv) | [COS]out (ppbv) |
|---|---|---|---|---|
| 0-3 | 80 | <10 | 25 | 25 |
| 3-6 | 70 | <10 | 25 | 25 |
| 6-9 | 50 | <10 | 20 | 20 |
| 9-12 | 35 | <10 | 15 | 15 |
| 12-15 | 50 | <10 | 20 | 20 |

EXAMPLE 2

According to the Invention

A synthesis gas stream comprising COS and $H_2S$ and having the composition: COS: 110 ppbv; $H_2S$: 100 ppbv; CO: 36%; $H_2$ 63%; $H_2O$ 0.2%; $N_2$ 0.3%, $CO_2$ 0.5% was contacted with a fixed bed containing solid adsorbent comprising ZnO at elevated temperature. The process conditions were: P=40 bar, T=140° C., GHSV=9300 h$^{-1}$. The concentration of COS and $H_2S$ was measured after contacting the synthesis gas stream with solid adsorbent. It was observed that COS as well as $H_2S$ were removed to levels below the detection limit, indicating that the amount of COS was below 2 ppbv and the amount of $H_2S$ was below 1 ppbv.

EXAMPLE 3

A synthesis gas stream comprising COS and further comprising 36.2% CO, 62.8% $H_2$, 0.2% $H_2O$ and 0.8% $N_2$ was contacted with a solid adsorbent comprising ZnO during certain time periods. The process conditions were: P=40 bar, T=70-100° C., GHSV=14200 h$^{-1}$. The conversion of COS was measured at different temperatures. The results are given in table 2.

TABLE 2

COS conversion over a ZnO containing guard bed at various temperatures and at various COS feed concentration ([COS]in).

| Temperature (° C.) | [COS]in 10 ppmV (%) | [COS]in 25 ppmV (%) | [COS]in 50 ppmV (%) | [COS]in 100 ppmV (%) |
|---|---|---|---|---|
| 70 (comparative) | 37 | 31 | 31 | 37 |
| 80 (comparative) | 65 | — | 67 | 67 |
| 90 (comparative) | 97 | — | 95 | 93 |
| 100 (invention) | — | — | — | 99 |

EXAMPLE 4

According to the Invention

A synthesis gas stream comprising HCN and having a composition: CO 35.6%, $H_2$ 59.1%, $N_2$ 0.8%, $H_2O$ 1.1%, $CO_2$ 2.5% and HCN 110 ppmv was contacted with a solid adsorbent comprising ZnO during certain time periods. Process conditions: GHSV=9300 h−1, P=40 bar. The HCN conversion as measured is given in table 3.

TABLE 3

HCN conversion over ZnO containing guard bed at various temperatures.

| Temperature (° C.) | HCN Conversion (%) |
|---|---|
| 140 | 16.2 |
| 160 | 32.5 |
| 180 | 73.1 |
| 200 | 99.2 |

That which is claimed is:

1. A process for removing COS and $H_2S$ from a feed synthesis gas stream comprising COS, $H_2S$, $NH_3$ and HCN, wherein the process comprises contacting the feed synthesis gas stream in the presence of up to 1% volume water with a solid adsorbent at a temperature in the range of from 100 to 240° C. to remove COS, $H_2S$, $NH_3$ and HCN, thereby obtaining a purified synthesis gas stream, wherein the solid adsorbent comprises 0.1 to 3 wt % alumina, based on the solid adsorbent, and a metal or an oxide of said metal or a combination thereof, wherein the metal is selected from the group consisting of Ag, Sn, Mo, Fe and Zn; and contacting the purified synthesis gas stream with a washing liquid at a temperature in the range of from 40 to 110° C. and a pressure of from 20 to 80 bara to remove any $NH_3$ present in the purified synthesis gas stream, thereby obtaining a washed purified synthesis gas stream having less than 10 ppbv each of COS, $H_2S$, $NH_3$ and HCN, suitable for use in a Fischer-Tropsch process.

2. A process according to claim 1, wherein the temperature at which the purified synthesis gas stream is contacted with the washing liquid is in the range of from 70 to 110° C.

3. A process according to claim 1, wherein the temperature at which the feed synthesis gas stream is contacted with the solid adsorbent is in the range of from 140 to 200° C.

4. A process according to claim 1, wherein the solid adsorbent is supported on a support material selected from the group consisting of alumina, silica, titania, zirconia, carbon, silicon carbide, kieselguhr and mixtures thereof.

5. A process according to claim 1, wherein the solid adsorbent comprises ZnO.

6. A process according to claim 5, wherein the solid adsorbent comprises less than 100 ppmw of Group VIII metals alumina.

7. A process according to claim 6, wherein the purified synthesis gas stream is contacted with the washing liquid at a pressure of from 40 to 60 bara.

8. A process according to claim 7, wherein the purified synthesis gas comprises less than 5 ppbv COS.

9. A process according to claim 8, wherein the purified synthesis gas stream comprises less than 5 ppbv $H_2S$.

10. A process according to claim 9, wherein the purified synthesis gas stream comprises less than 1 ppbv each of COS and $H_2S$.

11. A process according to claim 1, wherein the feed synthesis gas stream is obtained by contacting synthesis gas from a synthesis gas generation unit with scrubbing liquid to remove particulate matter.

12. A process according to claim 11, wherein the temperature at which the feed synthesis gas stream is contacted with scrubbing liquid is in the range of from 120 to 160° C.

13. A process according to claim 1, wherein the purified synthesis gas stream is contacted with a hydrocarbon synthesis catalyst at a temperature in the range of 150 to 300° C. to produce hydrocarbons, followed by hydroconversion and distillation of the hydrocarbons thus obtained.

14. A process according to claim 13, wherein the hydrocarbon synthesis catalyst comprises cobalt.

15. Hydrocarbons, obtainable by a process according to claim 13 or 14.

16. A process according to claim 9, wherein the amount of water present in the feed synthesis gas is approximately 0.2% v/v.

\* \* \* \* \*